United States Patent
Saari et al.

(10) Patent No.: US 8,597,001 B2
(45) Date of Patent: Dec. 3, 2013

(54) ELECTRIC MACHINE WITH AIR COOLING SYSTEM

(75) Inventors: Juha Saari, Espoo (FI); Charles B. Powell, Westminster, CO (US); Arttu Reunanen, Klaukkala (FI); Erkki Lantto, Helsinki (FI)

(73) Assignees: Sundyne Corporation; Gardner Denver Deutschland GmbH (DE)

( * ) Notice: Subject to any disclaimer, the term of this patent is extended or adjusted under 35 U.S.C. 154(b) by 784 days.

(21) Appl. No.: 12/600,166

(22) PCT Filed: May 14, 2007

(86) PCT No.: PCT/EP2007/004296
§ 371 (c)(1),
(2), (4) Date: May 4, 2010

(87) PCT Pub. No.: WO2008/138379
PCT Pub. Date: Nov. 20, 2008

(65) Prior Publication Data
US 2010/0215526 A1 Aug. 26, 2010

(51) Int. Cl.
*F04B 39/06* (2006.01)
(52) U.S. Cl.
USPC .......... 417/423.8; 417/423.7; 417/423.1; 310/59; 310/58
(58) Field of Classification Search
USPC ........... 417/423.8, 423.1, 423.7; 310/58, 59, 310/52, 54
See application file for complete search history.

(56) References Cited

U.S. PATENT DOCUMENTS

| | | | | |
|---|---|---|---|---|
| 3,110,827 A * | 11/1963 | Baudry | ............. | 310/55 |
| 3,675,056 A * | 7/1972 | Lenz | ............. | 310/54 |
| 4,141,604 A * | 2/1979 | Habermann et al. | ......... | 310/90.5 |
| 5,633,543 A * | 5/1997 | Jarczynski et al. | ............. | 310/59 |
| 5,652,469 A * | 7/1997 | Boardman et al. | ............. | 310/58 |
| 6,232,682 B1 * | 5/2001 | Hall | ............. | 310/52 |
| 6,262,502 B1 * | 7/2001 | Semba et al. | ............. | 310/52 |
| 6,538,351 B2 * | 3/2003 | Semba et al. | ............. | 310/52 |
| 6,639,334 B2 * | 10/2003 | Chen et al. | ............. | 310/52 |
| 6,997,686 B2 * | 2/2006 | Agrawal et al. | ............. | 417/350 |
| 7,647,762 B2 * | 1/2010 | Uselton | ............. | 60/39.511 |
| 2004/0066099 A1 * | 4/2004 | Weeber et al. | ............. | 310/58 |

FOREIGN PATENT DOCUMENTS

| | | |
|---|---|---|
| CH | 397844 | 8/1965 |
| GB | 772973 | 4/1957 |
| JP | 61085035 | 4/1986 |
| JP | 8140310 | 5/1996 |
| JP | 2007104783 | 4/2007 |

* cited by examiner

*Primary Examiner* — Charles Freay
*Assistant Examiner* — Christopher Bobish
(74) *Attorney, Agent, or Firm* — James B. Conte; Husch Blackwell LLP

(57) ABSTRACT

An electric machine comprising a stator having a stator winding, a housing accommodating the stator, a rotor, and an air gap having a generally cylindrical configuration. A plurality of circumferentially distributed, radial, first cooling gas ducts are provided in a stator core. Jets of cooling gas are directed to regions of an end winding which are relatively distant from the stator core, in order to achieve impingement cooling thereof. Flows of cooling gas are directed to portions of the end winding which are between the impingement cooled regions of the end winding and the respective front face of the stator core.

19 Claims, 1 Drawing Sheet

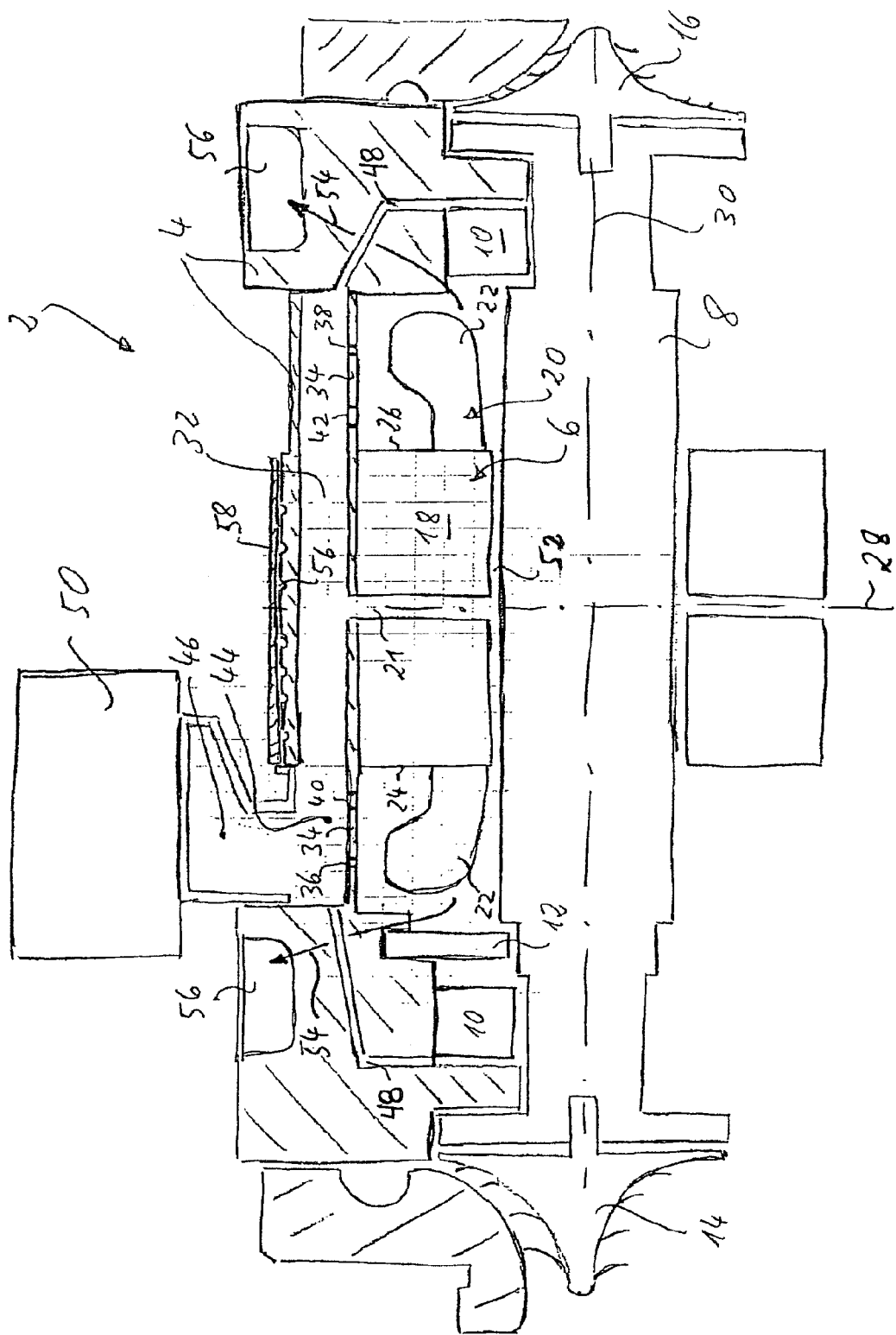

US 8,597,001 B2

ELECTRIC MACHINE WITH AIR COOLING SYSTEM

This application is entitled to the benefit of, and incorporates by reference essential subject matter disclosed in PCT Application No. PCT/EP2007/004286 filed on May 14, 2007.

This application is entitled to the benefit of, and incorporates by reference essential subject matter disclosed in PCT Application No. PCT/EP2007/004286 filed on May 14, 2007.

FIELD OF THE INVENTION

The invention relates to the cooling of an electric machine that comprises a stator having a winding, a rotor, and an air gap, having a generally cylindrical configuration.

BACKGROUND OF THE INVENTION

Electric machines require cooling, in order to remove the heat produced by the losses of the machine and in order to make sure that the temperatures in the machine do not exceed the maximum design temperatures set for the various part of the machine. Those losses are essentially the iron losses of the stator core, the copper losses of the winding, the losses in the rotor, the friction losses in the air gap, and the bearing losses. If the maximum design temperature of the winding is exceeded, there is a risk of a failure in the electrical insulation of the winding wires.

Electric machines designed for a high rotational speed need a more sophisticated cooling system than electric machines designed for more common rotational speeds of for example less than 5,000 $min^{-1}$, because the losses are produced in a smaller machine volume.

Removing from the machine the amount of heat produced by the losses with high efficiency is an important task because heat removal requires power and therefore is a factor reducing the overall efficiency of the electric machine. A highly sophisticated cooling is a valuable contribution to the high overall efficiency of the electric machine.

SUMMARY OF THE INVENTION

The invention provides an electric machine comprising
(a) a stator, comprising a stator core and a stator winding, that includes a first winding part accommodated in spaces of the stator core and an end winding as a second winding part, the end winding being located axially in front of a first front face and an opposed second front face of the stator core;
(b) a housing that accommodates the stator;
(c) a rotor that is rotatably supported;
(d) an air gap that has a generally cylindrical configuration;
(e) a plurality of circumferentially distributed first cooling gas ducts that are positioned at locations between the first and second front faces of the stator core and extend in generally radial direction between a respective outer inlet and the air gap;
(f) the housing comprising a plurality of first holes, directed towards the end winding in front of the first front face of the stator core to direct jets of cooling gas against the end winding for impingement cooling thereof;
(g) the housing comprising a plurality of second holes, directed towards the end winding in front of the second front face of the stator core to direct jets of cooling gas against the end winding for impingement cooling thereof;
(h) the housing comprising a plurality of third holes, directed towards the end winding in front of the first front face of the stator core to direct a flow of cooling gas through the end winding and towards a portion of the rotor behind the end winding;
(i) the housing comprising a plurality of fourth holes, directed towards the end winding in front of the second front face of the stator core to direct a flow of cooling gas through the end winding and towards a portion of the rotor behind the end winding;
(k) and at least one of:
(k1) a blowing fan operable to provide a flow of cooling gas through the electric machine, the blowing fan being in cooling gas flow connection with the first cooling gas ducts, the first holes, the second holes, the third holes, and the fourth holes;
(k2) or a sucking fan operable to provide a flow of cooling gas through the electric machine, the sucking fan being in cooling gas flow connection with those spaces in the electric machine, which receive cooling gas exiting from the air gap, the first holes, the second holes, the third holes, and the fourth holes.

Preferred embodiments of the invention are indicated in the dependent claims 2-12.

The invention further provides a turbocompressor and a turbogenerator, each including an electric machine according to the invention.

The advantageous effects provided by the invention comprise the following:

Particularly intense cooling is provided for the end winding. The axially outer end portions of the end winding are cooled by impingement cooling jets of cooling gas, whereas the axially inner portions of the end winding are cooled by slower flows of cooling gas. This is an optimum adaptation to the distribution of heat sources and to the geometry of the end winding.

The design of the cooling provided by the invention has a relatively low power demand as compared to conventional cooling designs.

The design of the cooling provided by the invention is particularly suited for electric machines operating at high rotational speeds as compared to many conventional electric machines that operate at rotational speeds lower than 5,000 $min^{-1}$.

In a preferred embodiment, the cooling system includes liquid cooling for the outer circumference of the stator core and combines such liquid cooling with the cooling as described herein in such a way that the liquid cooling channels do not interfere with the gas cooling flow paths.

The electric machine of the invention, despite its highly sophisticated cooling system, does not imply significant complications or high costs of manufacture.

In an exemplary embodiment of the invention the electric machine has a design maximum rotational speed of at least 20 000 min−1

In an exemplary embodiment of the invention the design maximum rotational speed is at least 40,000 min−1.

In an exemplary embodiment of the invention the design rotor tip speed is at least 200 m/s.

In an exemplary embodiment of the invention the electric machine has a design nominal power of at least 140 kW.

In an exemplary embodiment of the invention the design nominal power is at least 200 kW.

In an exemplary embodiment of the invention the electric machine has design losses of less than 8% of its nominal power.

In an exemplary embodiment of the invention the fan has a design power of less than 1.5% of the nominal power of the electric machine.

In an exemplary embodiment of the invention the stator winding has a design maximum allowed temperature of 180° C.

In an exemplary embodiment of the invention the electric machine is designed such that at least 60% of the total flow of cooling gas are passed through the first and second holes.

In an exemplary embodiment of the invention the cooling gas is air.

BRIEF DESCRIPTION OF THE DRAWING

A preferred embodiment of the invention and preferred features of the invention a elucidated in the following, wherein reference is made to a drawing. The drawing is a longitudinal section and shows essentially only the upper half of a turbocompressor in somewhat schematic form.

DETAILED DESCRIPTION

The turbocompressor 2 shown in the drawing comprises a housing 4, a stator 6 accommodated in the housing 4, a rotor 8 extending through the hollow stator 6, bearings 10 and 12 of the rotor 8, and two compressor wheels 14 and 16 mounted to the rotor 8.

The rotor 8 is for example a solid steel rotor or a rotor having a solid steel body with a thin copper sleeve. The drawing shows two active radial magnetic bearings 10, and at one axial side, an active axial magnetic bearing 12. As an alternative, two active axial magnetic bearings may be provided. "Active magnetic bearing" means a bearing where the position of the rotor 8 with respect to the stationary bearing 10 or 12 is continuously sensed and the magnetic force of the bearing is continuously varied to keep the rotor 8 within a predetermined range of positioning in relation to the bearing.

The stator 6 comprises a stator core 18 consisting of a stack of ring-shaped iron sheets, and a stator winding 20 formed of copper wires. A first winding part is accommodated in slot-shaped spaces in the stator core 18, and a second winding part is in form of an end winding 22. The end winding 22 comprises a first part in front of the left-hand first front face 24 of the stator core 18 and a second part in front of the right-hand front face 26 of the stator core 18. The whole stator 6 is generally symmetrical with respect to a middle plane 28 extending perpendicularly with respect to an axis of rotation 30 the rotor 8. Approximately in the axial middle of the stator core there is a plurality of circumferentially distributed first cooling gas ducts 21, which extend in generally radial direction.

The stator 6 is mounted within the housing 4. The central portion of the housing 4 surrounds the stator core 8 and comprises a plurality of circumferentially distributed second cooling gas ducts 32 which extend substantially in axial direction. The housing 4 continues beyond the first front face 24 and beyond the second front face 26 of the stator core 18 and forms there substantially cylindrical housing walls 34 which encircle the end winding 22 at both sides of the stator 6. Each wall portion 34 comprises a row of circumferentially distributed first holes 36 or second holes 38 respectively (one row at each axial side of the motor) and a row of circumferentially distributed third holes 40 or fourth holes 42 respectively (one row at each axial side of the motor). The first and second holes 36, 38 have a relatively small diameter of for example 5 mm, whereas the third and fourth holes 40, 42 have a larger diameter of for example 15 mm.

At the right-hand side the housing 4 continues beyond the second front face 26 with such a radial thickness that the second cooling gas ducts 32 continue for approximately the same axial length as the right-hand part of the end winding 22 has. At the left-hand side there is a cooling gas ring channel 44, bounded at its inner diameter by the wall portion 34 and being in cooling gas flow connection with an inlet 46 and with the left-hand ends of the second cooling gas duct 32.

If desired, a cooling gas ring channel may be provided at the right-hand end portion of the second cooling gas ducts 32 as well.

The housing 4 continues to the left-hand side to mount the axial bearing 12 and one of the radial bearings 10. At the right-hand side the housing 4 continues to mount the other of the two radial bearings 10. At the left-hand side, there is a plurality of circumferentially distributed third cooling gas ducts 48 which have the inlets to the ring channel 44 and their outlets to a space at the left-hand side of the radial bearing 10. At the right-hand side there are an analogous plurality of third cooling gas ducts 48 which, however, have their inlets open to respective ones of the second cooling gas ducts 32 and extending to a space at the right-hand side of the right-hand radial bearing 10.

A schematically shown blowing fan 50 is in cooling gas flow connection with the ring channel 44.

Flow of Cooling Gas is as Follows:

Cooling gas pressurized by the blowing fan 50 is flown into the ring channel 44, from there, in a first flow, into the second cooling gas ducts 32, from there, in a second flow, into the first cooling gas ducts 21 and, as a third flow, to the second and fourth holes 38, 42. On the other hand, there is, as a fourth flow, a flow directly from the ring channel 44 through the first and third holes 36, 40. The second flow, exiting the first cooling gas ducts 21 divides there and flows to the left and to the right through the air gap 52.

By means of the first and second holes 36, 38 jets of cooling gas are found, which are directed to those regions of the end winding 22 which are more distant from the front faces 24, 26 than the remainder of the end winding 22. The jets of cooling gas impinge the end winding 22 in those regions and are broken into very small quantities of gas by impinging. This results in a very intensive cooling of those regions of the end winding 22.

The cooling gas flows through the third and fourth holes 40, 42 with a smaller flow velocity. They flow through those regions of the end winding 22 which are closer to the front faces 24, 26 than the more distant regions of the end winding 22 described in the preceding paragraph. Those slower flows can pass through the gaps between the bundles of wires exiting from the slots in the stator core 18 and can cool both regions of the circumference of the rotor 8 which are behind the end winding 22 and can substantially contribute to the cooling of the rotor 8.

The flows of cooling gas directed to the radial bearings 10 pass the bearings 10 in a direction toward the axial center of the motor. In the case of the left-hand side, this flow also cools the axial bearing 10.

The cooling gas which has cooled the stator core 18, the air gap 22, and the end winding 22 leaves the housing 4 in two streams 54, one at the left hand-side and one at the right-hand side. The housing 4 has suitable, substantially radially extending channels and two surrounding ring channels 56 to permit the exit flows 54. The cooling gas which has cooled the bearings 10, 12 joins with those exit flows 54.

That part of the housing which mounts the stator core 18 is provided with circumferential grooves 56 in its outer circumference and is provided with a jacket sleeve 58 therearound. In this way a cooling liquid jacket is formed, wherein cooling liquid such as water can be circulated through grooves 56. The drawing illustrates that the ring channel 44 is located at the left-hand side in front of the inlet openings of the second cooling gas ducts 32. In this way, the ring channel 44 sits axially beside the cooling liquid jacket 56, 58 so that no radial passages for cooling gas through the cooling liquid jacket are required. Embodiments of the invention without cooling liquid jacket are possible, and in this case it might be more convenient to place the ring channel 44 substantially at the location of the middle plane 28, thereby arriving at a symmetrical design of the gas cooling system. It is stressed here that it is possible to replace the one group of first cooling gas ducts 21 by a plurality of such groups wherein each of the groups include a plurality of circumferentially distributed ducts 21. The groups have axial distances between each other.

The drawing shows that a first compressor wheel 14 is mounted to the left-hand end portion of the rotor 8 and that a second compressor wheel 16 is mounted to the right-hand end portion of the rotor 8. Air or any other gas to be compressed is passed by the first compressor wheel 14 first, then passed through an intermediate cooler, and then passed by the second compressor wheel 16. The first compressor wheel 14 is surrounded by the first compressor housing (only part of which is shown in the drawing) and the second compressor wheel 16 is surrounded by a second compressor housing (only part of which is shown in the drawing).

If one replaces the compressor wheels 14, 16 by radial turbine wheels, there is provided a turbogenerator for electricity. It is stressed that the electric motor of the invention may be used for driving any arbitrary equipment and is not at all restricted to the use of driving a compressor. The same is true for the electric current generator of the invention which may be driven by any arbitrary driving equipment.

If one replaces the blowing fan 50 by a sucking fan sucking the exit flows 54, there is provided an alternative embodiment of the invention. Fresh cooling gas is sucked into the machine for example by means of the ring channel(s) 44.

Just in order to give a non-restricting example, the following data of a tested embodiment are given: design as schematically shown in the drawing; power of the motor 300 kW; rotational speed 60,000 min$^{-1}$; pressure rise created by the blowing fan 2.5 to 3 kPa above ambient pressure; total flow rate of cooling air 20 to 25 m$^3$/min; power consumption of fan 2 to 2.5 kW; flow divided between the end winding 22 and the first cooling gas ducts 21 with a ratio of about 80/20; average temperature rise of the cooling air having passed the motor about 50° C.; ambient air temperature 40° C.; maximum temperature in the motor (this is in the end winding) approximately 160° C.; water flow rate in the cooling jacket 56, 58 is appr. 0.2 kg/s.

The most preferred cooling gas is air. The motor may be equipped with a frequency converter. The fan may be driven by an electric motor equipped with a frequency converter.

The invention claimed is:

1. An electric machine, comprising:
   (a) a stator, comprising a stator core and a stator winding, that includes a first winding part accommodated in spaces of the stator core and an end winding as a second winding part, the end winding being located axially in front of a first front face and an opposed second front face of the stator core;
   (b) a housing that accommodates the stator;
   (c) a rotor that is rotatably supported;
   (d) an air gap that has a generally cylindrical configuration;
   (e) a plurality of circumferentially distributed first cooling gas ducts that are positioned at locations between the first and second front faces of the stator core and extend in generally radial direction between a respective outer inlet and the air gap;
   (f) the housing comprising a plurality of first holes directed towards the end winding in front of the first front face of the stator core to direct jets of cooling gas against the end winding for impingement cooling thereof;
   (g) the housing comprising a plurality of second holes directed towards the end winding in front of the second front face of the stator core to direct jets of cooling gas against the end winding for impingement cooling thereof;
   (h) the housing comprising a plurality of third holes directed towards the end winding in front of the first front face of the stator core to direct a flow of cooling gas through the end winding and towards a portion of the rotor behind the end winding;
   (i) the housing comprising a plurality of fourth holes directed towards the end winding in front of the second front face of the stator core to direct a flow of cooling gas through the end winding and towards a portion of the rotor behind the end winding;
   (j) the first and second holes having a smaller diameter than the third and fourth holes;
   (k) and at least one of: (k1) a blowing fan operable to provide a flow of cooling gas through the electric machine, the blowing fan being in cooling gas flow connection with the first cooling gas ducts, the first holes, the second holes, the third holes, and the fourth holes; (k2) or a sucking fan operable to provide a flow of cooling gas through the electric machine, the sucking fan being in cooling gas flow connection with those spaces in the electric machine, which receive cooling gas exiting from the air gap, the first holes, the second holes, the third holes, and the fourth holes; and
wherein said housing further comprises a plurality of second cooling gas ducts that extend in a direction substantially parallel to an axis of rotation of said rotor and are circumferentially distributed around said stator, each second cooling gas duct being substantially continuous over the entire length of said stator and substantially perpendicular to, and in cooling gas flow connection with, at least one of said plurality of first cooling gas ducts and wherein at least one of said plurality of second cooling gas ducts are in cooling gas flow connection with at least one each of said first, second, third, and fourth holes and one of said blowing fan or said sucking fan.

2. The electric machine of claim 1, further comprising at least one of
   a) the first holes are circumferentially distributed and arranged with distance from the first front face of the stator core;
   b) the second holes are circumferentially distributed and arranged with distance from the second front face of the stator core;
   c) the third holes are circumferentially distributed and arranged with a smaller distance from the first front face of the stator core than the first holes; and
   d) the fourth holes are circumferentially distributed and arranged with a smaller distance from the second front face of the stator core than the second holes.

3. The electric machine of claim 1, wherein all said first cooling gas ducts are arranged generally in a common plane extending perpendicularly with respect to an axis of rotation of the rotor.

4. The electric machine of claim 1, wherein there are at least two groups of said first cooling gas ducts, in each of the groups the first cooling gas ducts being arranged generally in a common plane extending perpendicularly with respect to an axis of rotation of the rotor.

5. The electric machine claim 1, wherein the stator winding and the first through fourth holes are of a design that is generally symmetrical with respect to a middle plane extending perpendicularly with respect to an axis of rotation of the rotor.

6. The electric machine of claim 1, wherein said housing further comprises a cooling gas ring channel, that is in cooling gas flow connection with one of the outer inlets of the first cooling gas ducts and the second cooling gas ducts.

7. The electric machine of claim 6, wherein the cooling gas ring channel is arranged at the first front face or at the second front face of the stator core.

8. The electric machine of claim 1, wherein the fan is located offset from a middle plane of the stator core extending perpendicularly with respect to an axis of rotation of the rotor.

9. The electric machine of claim 1, wherein the housing comprises a cooling liquid jacket in thermal communication with at least one of the second cooling gas ducts.

10. The electric machine of claim 1, further comprising at least one magnetic axial bearing and two magnetic radial bearings.

11. The electric machine of claim 10, further comprising a plurality of circumferentially distributed third cooling gas ducts, that are in cooling gas flow connection with the fan, to supply cooling gas to the magnetic bearings.

12. The electric machine of claim 1, wherein the electric machine is an asynchronous electric motor or an asynchronous current generator having a winding-less rotor.

13. A turbocompressor unit comprising the electric machine of claim 1 as a motor and at least one compressor wheel mounted to the rotor of the motor.

14. The turbocompressor unit of claim 13, further comprising a first radial compressor wheel mounted to a first end portion of the rotor and a second radial compressor wheel mounted to an opposite second end portion of the rotor.

15. The turbocompressor of claim 14, designed such that air to be compressed passes the first compressor wheel first, is then cooled, and then passes the second compressor wheel.

16. A turbogenerator unit comprising the electric machine of claim 1 as a current generator and at least one turbine wheel mounted to the rotor of the current generator.

17. The turbogenerator unit of claim 16, further comprising a first radial turbine wheel mounted to a first end portion of the rotor and a second radial turbine wheel mounted to an opposite second end portion of the rotor.

18. The turbogenerator unit of claim 17, designed such that a flow of gas passes the first turbine wheel first and thereafter passes the second turbine wheel.

19. An electric machine, comprising
(a) a stator, comprising a stator core and a stator winding, that includes a first winding part accommodated in spaces of the stator core and an end winding as a second winding part, the end winding being located axially in front of a first front face and an opposed second front face of the stator core;
(b) a housing that accommodates the stator;
(c) a rotor that is supported for rotation within said housing;
(d) an air gap between said rotor and said stator, said air gap having a generally cylindrical configuration;
(e) a plurality of radially extending first cooling gas ducts through said stator core and in fluid communication with said air gap, said plurality of and being circumferentially distributed around said rotor and positioned between the first and second front faces of the stator core;
(f) the housing comprising a plurality of second cooling gas ducts that extend in generally axial direction substantially parallel to an axis of rotation of said rotor, said plurality of second cooling gas ducts are circumferentially distributed around said stator, each second cooling gas duct being substantially continuous over the entire length of said stator and wherein said plurality of cooling gas ducts are in fluid communication with at least one of the plurality of the first cooling gas ducts;
(g) said plurality of said second cooling gas ducts, each including a first hole directed toward the end winding in front of the first front face of the stator core to direct jets of cooling gas against the end winding for impingement cooling thereof;
(h) said plurality of said second cooling gas ducts, each including a second hole directed towards the end winding in front of the second front face of the stator core to direct jets of cooling gas against the end winding for impingement cooling thereof;
(i) said plurality of said second cooling gas ducts, each including a third hole directed towards the end winding in front of the first front face of the stator core to direct a flow of cooling gas through the end winding and towards a portion of the rotor behind the end winding;
(j) said plurality of said second cooling gas ducts, each including a fourth hole directed towards the end winding in front of the second front face of the stator core to direct a flow of cooling gas through the end winding and towards a portion of the rotor behind the end winding;
(k) the first and second holes having a smaller diameter than the third and fourth holes;
(l) the housing comprising a ring channel around said stator, said ring channel being in flow cooling gas communication with said plurality of second cooling gas ducts;
(m) and a fan being at least one of: (m1) a blowing fan operable to provide a flow of cooling gas through the electric machine, the blowing fan being in cooling gas flow connection with said ring channel; (m2) or a sucking fan operable to provide a flow of cooling gas through the electric machine, the sucking fan being in cooling gas flow connection with at least one channel in the electric machine which receives cooling gas exiting from the air gap.

\* \* \* \* \*